(12) United States Patent
Otsubo et al.

(10) Patent No.: US 7,210,239 B2
(45) Date of Patent: May 1, 2007

(54) SLIDER DEVICE AND MEASURING INSTRUMENT

(75) Inventors: Seiichi Otsubo, Utsunomiya (JP); Koji Takesako, Utsunomiya (JP); Mitsuru Fukuda, Utsunomiya (JP)

(73) Assignee: Mitutoyo Corporation, Kawasaki-shi (JP)

( * ) Notice: Subject to any disclaimer, the term of this patent is extended or adjusted under 35 U.S.C. 154(b) by 108 days.

(21) Appl. No.: 11/098,948

(22) Filed: Apr. 5, 2005

(65) Prior Publication Data

US 2005/0235514 A1    Oct. 27, 2005

(30) Foreign Application Priority Data

Apr. 9, 2004 (JP) .............................. 2004-115969

(51) Int. Cl.
*G01B 5/004* (2006.01)
(52) U.S. Cl. .............................. 33/503; 33/1 M; 33/675
(58) Field of Classification Search ................. 33/503, 33/1 M, 675, 555, 556; 74/415, 422
See application file for complete search history.

(56) References Cited

U.S. PATENT DOCUMENTS

| | | | | | |
|---|---|---|---|---|---|
| 1,627,390 | A | * | 5/1927 | Hokanson | 400/357 |
| 1,813,321 | A | * | 7/1931 | Scherer | 400/354.2 |
| 3,241,243 | A | * | 3/1966 | Speer | 33/503 |
| 3,802,082 | A | * | 4/1974 | Gornowitz | 33/1 M |
| 4,166,323 | A | * | 9/1979 | Maag | 33/501.9 |
| 5,621,978 | A | * | 4/1997 | Sarauer | 33/503 |
| 5,893,669 | A | | 4/1999 | Sugai et al. | |
| 6,041,511 | A | * | 3/2000 | Broghammer | 33/503 |
| 6,247,242 | B1 | * | 6/2001 | Sujino | 33/706 |
| 6,408,530 | B1 | * | 6/2002 | Matzkovits et al. | 33/503 |
| 6,829,838 | B1 | * | 12/2004 | Weekers et al. | 33/702 |
| 2005/0225901 | A1 | * | 10/2005 | Otsubo et al. | 360/234.3 |

FOREIGN PATENT DOCUMENTS

| | | |
|---|---|---|
| JP | 10-184842 | 7/1998 |
| JP | 2001-151465 | 6/2001 |

OTHER PUBLICATIONS

Patent Abstracts of Japan, Apparatus for Quick Measurement of Size, Publication No. 01129101, Publication Date: May 22, 1989.

* cited by examiner

*Primary Examiner*—G. Bradley Bennett
*Assistant Examiner*—Amy R. Cohen
(74) *Attorney, Agent, or Firm*—Rankin, Hill, Porter & Clark LLP

(57) ABSTRACT

A slider device (200, 800) according to the present invention includes a base (200); a running head (300) slidably provided on said base (200) along the direction guided by a prespecified guide mechanism (400); a rack (510) provided in the fixed state on either said base (200) or said running head (300) along the guide direction by said guide mechanism (400); a pinion (520) engaging with rack teeth of said rack and driven and rotated by a prespecified power source; a swing arm (540) rotatably supporting said pinion (520), having an oscillation shaft (550) parallel to a rotary shaft of said pinion, and coupled to either one of said base (200) and said running head (300) via said oscillation shaft (550) in the oscillation-allowable state with the line extending between said oscillation shaft (550) and the rotary shaft of said pinion substantially parallel to said rack (510) as the reference state; and a biasing mechanism (570) for biasing said pinion (520) toward said rack (510) via said swing arm (540).

4 Claims, 7 Drawing Sheets

SLIDER DEVICE AND MEASURING INSTRUMENT

BACKGROUND OF THE INVENTION

1. Field of the Invention

The present invention relates to a slider device and a measuring instrument.

2. Description of Related Art

There has been known a rack and pinion mechanism in the prior art, and also there has been known a slider device driven by this rack and pinion mechanism (refer to, for instance, Patent document 1: Japanese Patent Publication No. 3133005, and Patent document 2: Japanese Patent Laid-Open Publication No. 2001-151465).

A slider device based on the conventional technology is shown in FIG. 7.

A slider device 900 includes a longitudinally extended base 910 having a flat upper surface, a running head 920 running back and forth along a longitudinal direction of the base 910, a guide mechanism 930 for guiding a running direction of the running head 920, and a driving unit 940 for driving the running head 920.

The guide mechanism 930 includes two rails 931, 932 laid in parallel to each other on the upper surface of the base 910 and sliders 933, 934 provided over and sliding on the rails 931, 932. The sliders 933, 934 are attached to a bottom surface of the running head 920, and the running direction is guided by sliding those sliders 933, 934 along the rails 931, 932.

The driving unit 940 is provided between the two rails 931, 932 and includes a rack 941 provided in parallel to the rails 931, 932, a pinion 942 engaging with the rack 942, a motor 943 for rotatingly driving the pinion 942

The motor 943 is fixed on the running head 920, and a rotor of the motor 943 is connected to the pinion 942.

A tooth surface of the rack 941 is provided on one side surface of the rack 942 (a surface facing either one of the rails), and a direction of rotation axis of the pinion 942 is perpendicular to an upper surface of the base 910.

In such a configuration, when the motor 943 rotates for driving, the pinion 942 is rotated. Then, the pinion 942 moves along the rack 942 because of engagement with the rack 941. The running head 920 runs with the motor 943 as the pinion moves. A direction of the running head 920 is guided along the direction of the rails 931, 932 as the running head 920 runs along the rails 931, 932.

However, since an orbit of the pinion 942 follows the tooth surface of the rack 941, if there is an error in accuracy such as irregularities of the rack's tooth surface, the pinion 942 is swung in a direction orthogonal to the rack 941, and the orbit of the pinion 942 starts vibrating. When the pinion 942 is swung in the direction orthogonal to the rack 941, the running head 920 is also swung in the same direction, so that the running accuracy of the running hear 920 is disadvantageously degraded.

It is principally possible to (forcibly) restrict the running direction of the running head 920 in a direction along the rails 931, 932 simply by improving the engagement accuracy between the rails 931, 932 and the sliders 933, 934 in the guide mechanism 930. However, driving units (such as a rack, a pinion, and a motor) are broken, and there occurs the problem that loose engagement is generated. On the contrary, when the pinion 942 is swung in the direction orthogonal to the rack 941 and a stress in the direction orthogonal to the rack 941 is generated, as the direction is orthogonal to the direction of guidance by the guide mechanism 930 (rails and sliders), a large stress is loaded to the guide mechanism 930 (rails and sliders). When a stress is loaded to the guide mechanism 930, durability and accuracy of the guide mechanism 930 (rails and sliders) are disadvantageously spoiled.

SUMMARY OF THE INVENTION

A main object of the present invention is to provide a slider device and a measuring instrument with improved running accuracy of a running head as well as improved durability and accuracy.

The slider device according to the present invention includes a base; a running head slidably provided on the base along the direction guided by a prespecified guide mechanism; a rack fixed to either one of the base or the running head along the direction guided by the guide mechanism; a pinion engaging with rack teeth of the rack and rotatingly driven by a prespecified power source; a swing arm rotatably supporting the pinion, having an swing shaft parallel to a rotary shaft of the pinion, and coupled to either one of the base or the running head via the swing shaft in a swingable manner with the state in which the line extending between the swing shaft and the rotary shaft of the pinion is substantially parallel to the rack as the reference state; and a biasing mechanism for biasing the pinion toward the rack via the swing arm.

With the configuration as described above, when the pinion is driven and rotated by a driving power source, a propelling force for relative movement is obtained because of engagement of the pinion with the rack, the running head slides because of the propelling force against the base.

For instance, if there is difference in heights of the rack teeth, a stress is loaded to the pinion and the rack in the direction orthogonal to the rack.

In this state, the pinion is supported in a swingable manner by the swing arm, so that the pinion moves in the substantially orthogonal direction to the rack and can escape from the stress. Therefore, an excessive engagement pressure never occurs between the pinion and the rack, and physical damages to the pinion and rack are prevented with the geometrical accuracy maintained. Further the stress in the direction orthogonal to the rack is absorbed by swing of the pinion via the swing arm, so that a stress in a direction different from the guide direction is never loaded to the guide mechanism, and therefore damages to the guide mechanism are prevented with the geometrical accuracy maintained. As a result, the running head can slide and move with high accuracy.

The pinion is supported in a swingable manner, but is biased by the biasing mechanism via the swing arm toward the rack, so that the engagement pressure between the rack and the pinion is maintained at a constant level. Because of this feature, not only disengagement between the rack and pinion is prevented, but also remarkable backlash is prevented.

When a swing edge side (an edge side contrary from the swing shaft, and the rotary shaft side of the pinion) of the swing arm supported in the swingable manner is biased from the state where the swing shaft and the rotary shaft of the pinion are substantially parallel to the rack, the pinion is biased in the direction substantially orthogonal to the tooth surface of the pinion. When the pinion is biased with an inclination angle against the rack, the biasing force may act differently according to the direction of relative movement between the pinion and the rack (the following direction or the counter direction against the biasing direction), but as the pinion is biased in the substantially orthogonal direction to the rack, an appropriate engagement pressure is insured regardless of the direction of relative moment between the rack and the pinion.

The biasing mechanism according to the present invention preferably includes a wall plate section provided at a position opposite to the tooth surface of the rack with the pinion in between, a tension roller contacting and rolling along the wall plate, a lever arm provided in a swingable manner from the state substantially parallel to the swing arm as the reference state and rotatably supporting the tension roller at substantially central position thereof, a biasing unit for biasing an edge of the lever arm away from the swing arm, and a coupling lever continuously protruding from the swing edge side of the swing arm and rotatably coupled to the ether edge f the lever arm.

With the configuration, as the lever arm swings against the rotary shaft of the tension roller as a supporting point, so that the swing edge of the swing arm is biased toward the rack due to the principle of leverage, and as a result the pinion is biased toward the rack.

The measuring instrument according to the present invention includes, the slider device, a measuring section having a detecting section for detecting a workpiece by scanning a surface of the workpiece, and a position detector for detecting a coordinate position of the detecting section.

With the configuration as described above, the same actions and effects as those described above are provided. Further accuracy in sliding movement of the slider device becomes higher, so that a workpiece can be measured with higher accuracy.

DETAILED DESCRIPTION OF PREFERRED EMBODIMENT(S)

Figure 1:
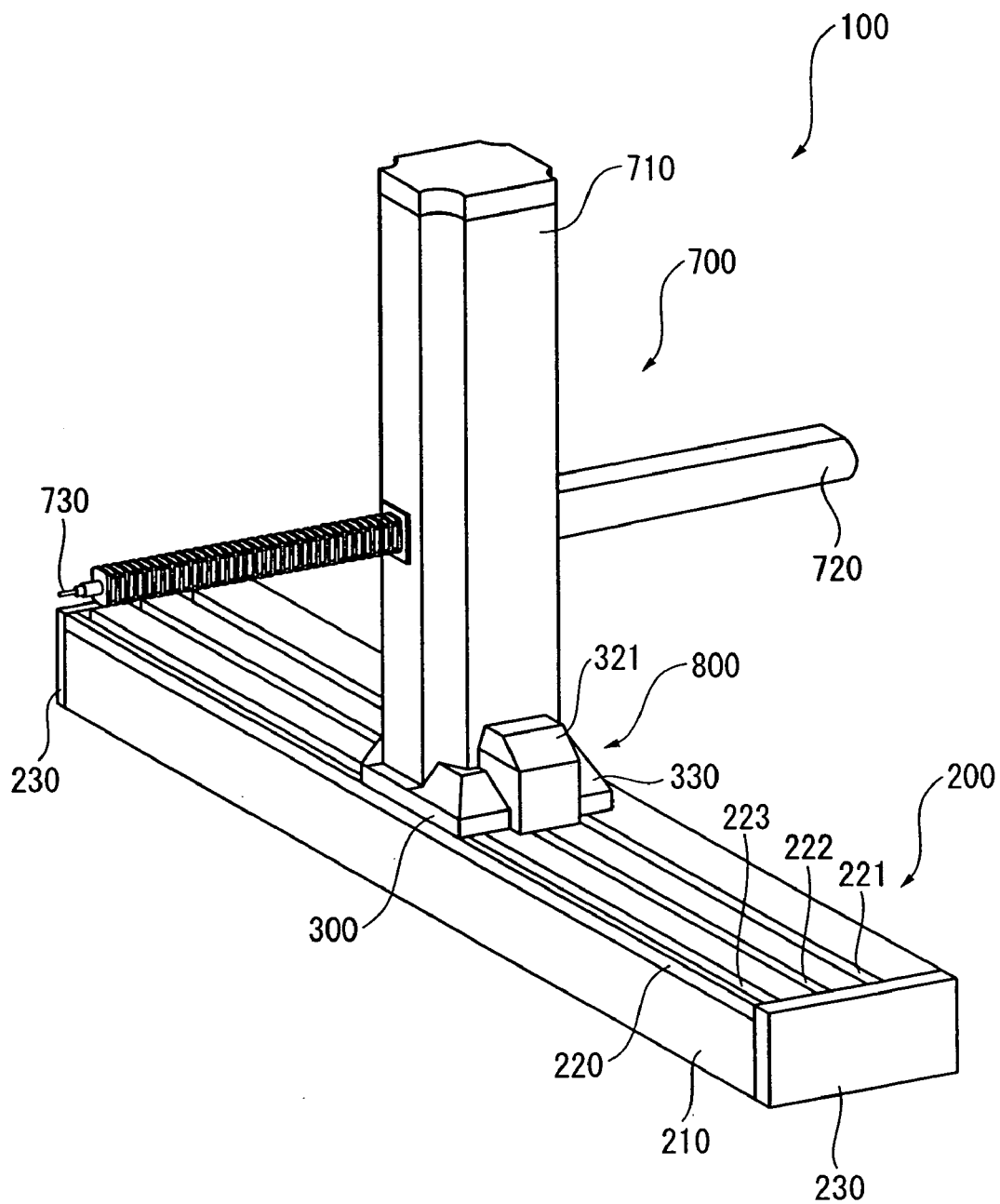
FIG. 1 is a general view showing a measuring instrument according to one embodiment of the present invention.

An embodiment of the present invention is described with reference to the reference numerals attached to various components in the drawings.

An embodiment according to the present invention is described with reference to FIGS. 1 to 6.

Figure 2:
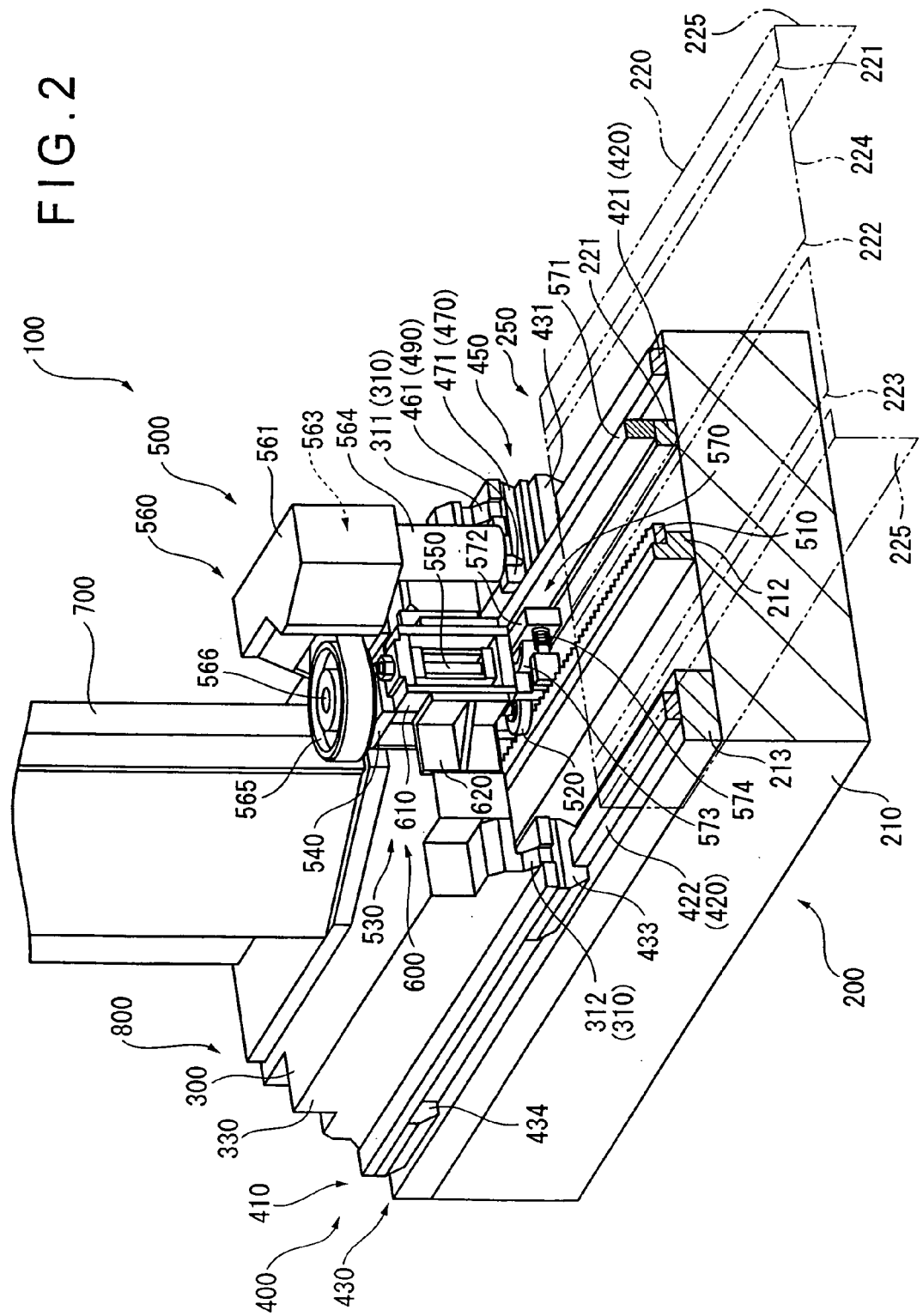
FIG. 2 is an enlarged view showing a running section and a base according to the embodiment in the state where a base cover has been removed.
Figure 3:
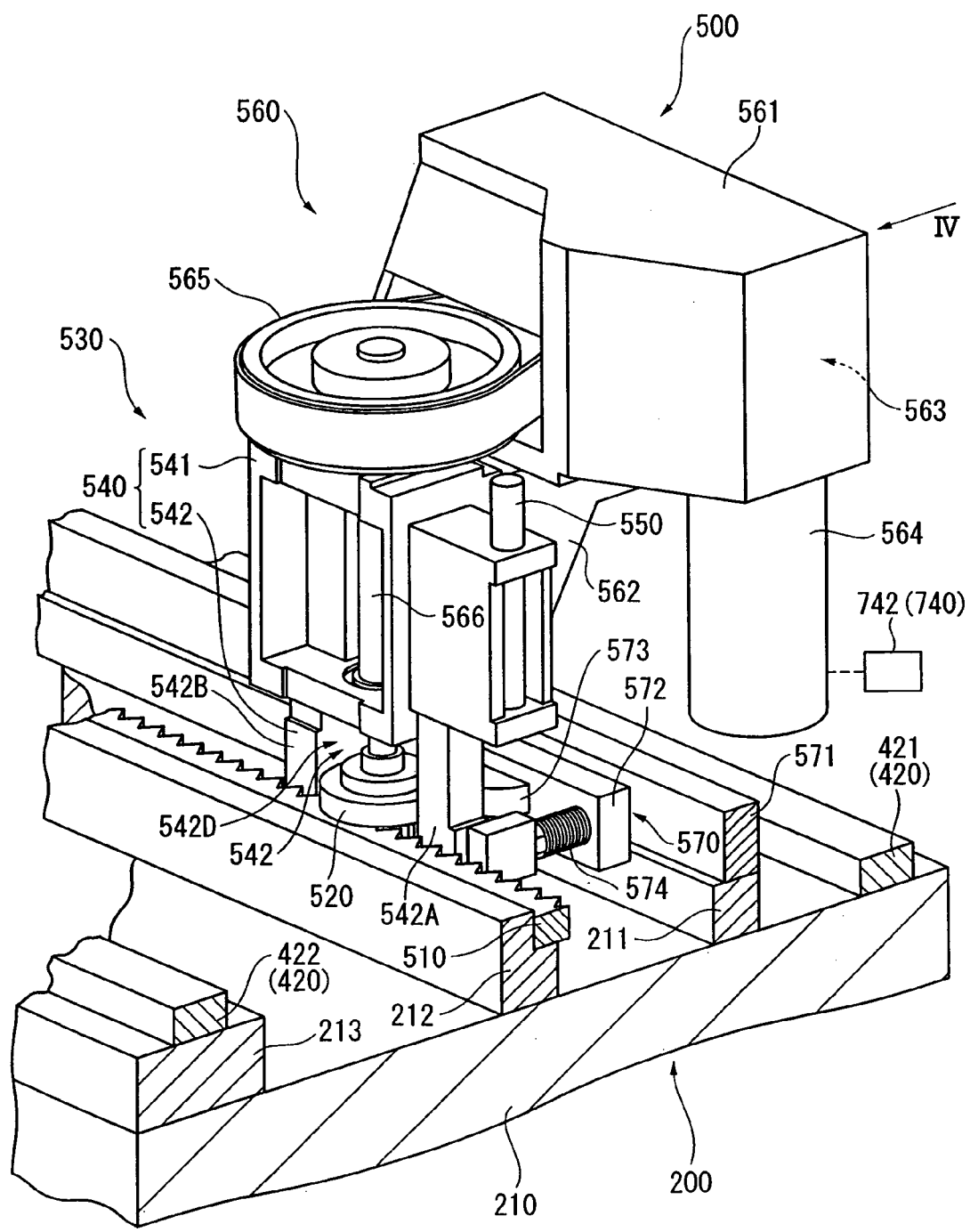
FIG. 3 is a partial view showing a drive unit in the embodiment.
Figure 4:
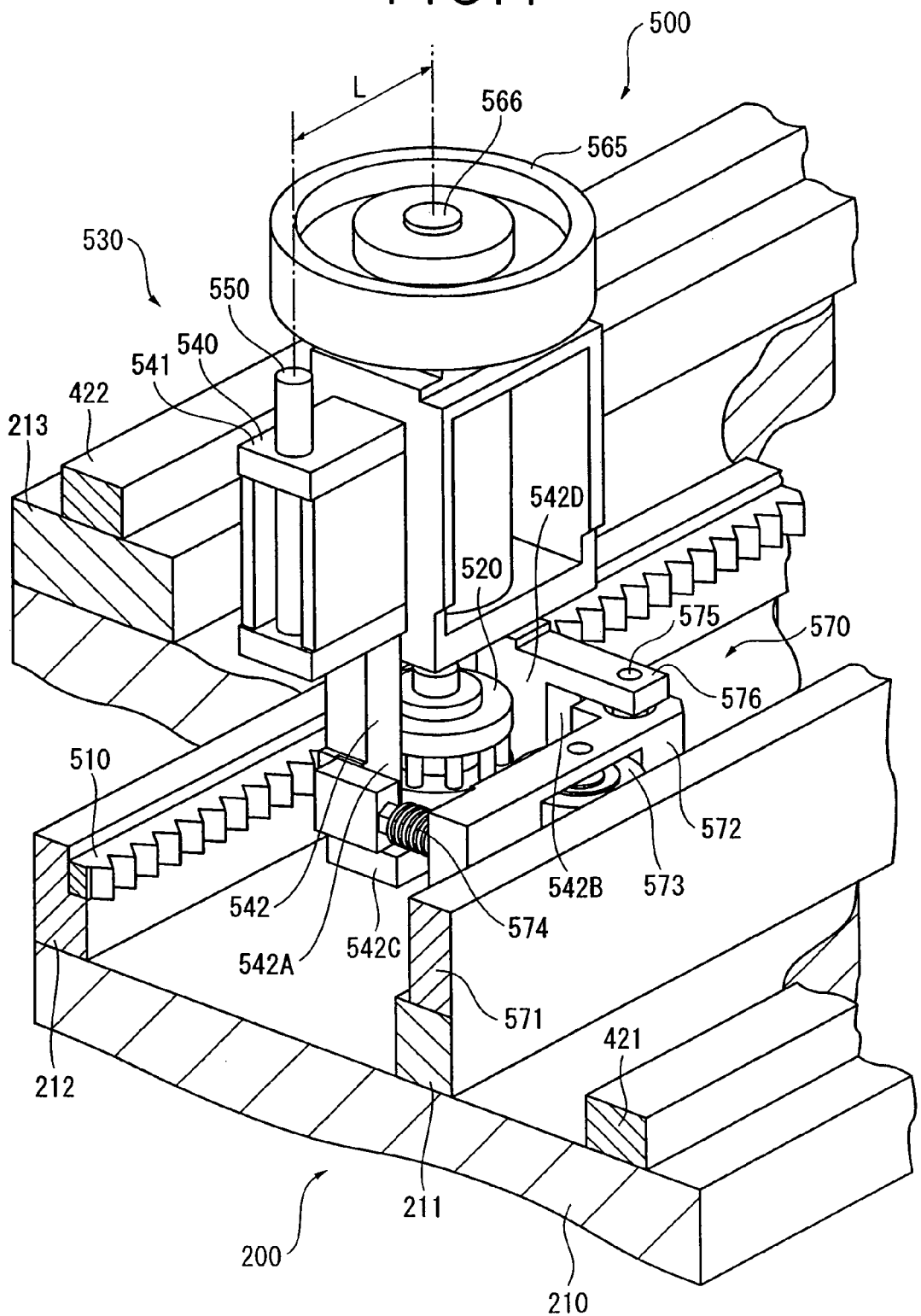
FIG. 4 is a partial view showing the drive unit according to the embodiment viewed from the IV direction in FIG. 3.
Figure 5:
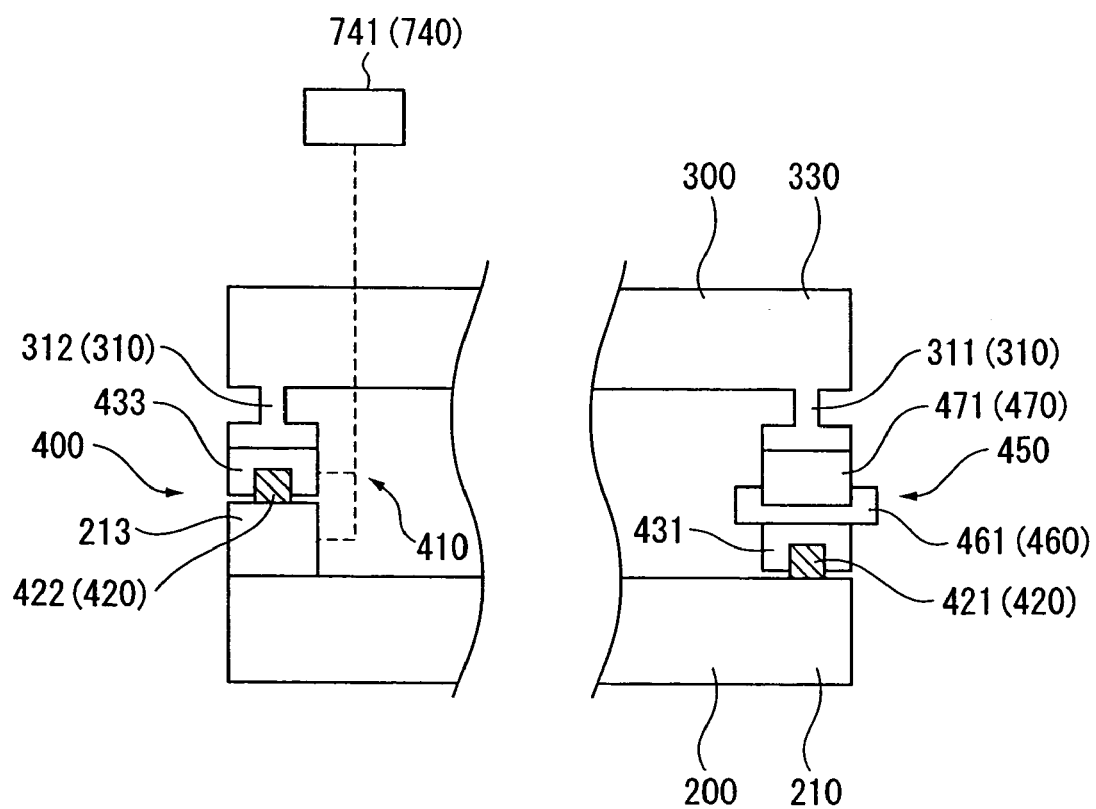
FIG. 5 is a partial view showing a guide mechanism according to the embodiment viewed in the running direction of a running head.
Figure 6:
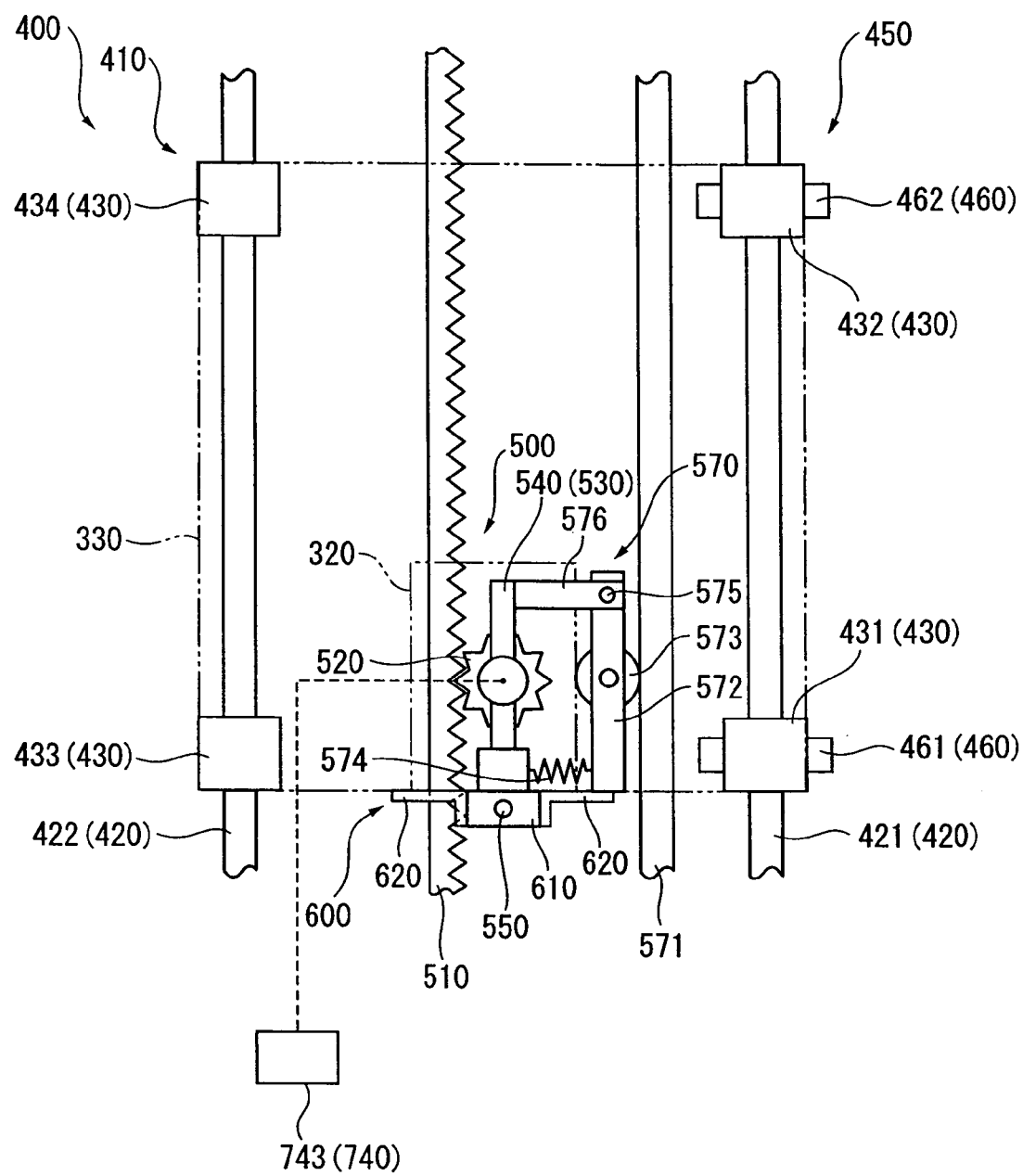
FIG. 6 is a top plane view showing the running section in the embodiment.
Figure 7:
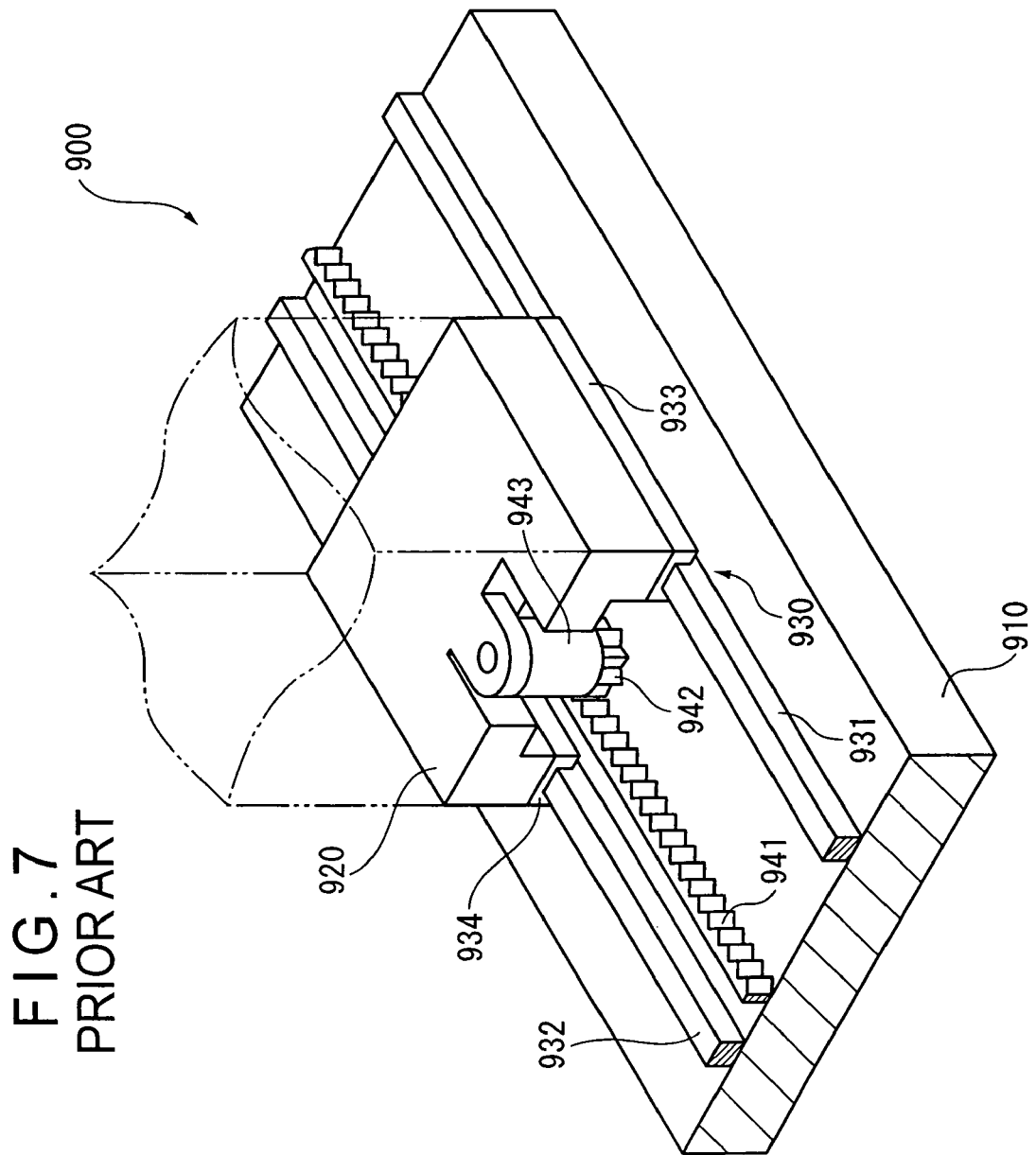
FIG. 7 is a view showing a slider device based on the conventional technology.

FIG. 1 is a general view showing a measuring instrument. FIG. 2 is an enlarged view showing a running section and a base in the state where a base cover has been removed. FIG. 3 is a partial view showing a drive unit. FIG. 4 is a partial view of the drive unit viewed from the IV direction in FIG. 3. FIG. 5 is a partial view showing a guide mechanism viewed from the running direction of a running head. FIG. 6 is a top plain view showing the running section.

A coordinate measuring machine 100 as a measuring instrument according to the present invention includes a landscape base 200, a running section 800 capable of running back and forth along a longitudinally extended direction provided on the base 200, and a measuring section 700 moved by the running section 800 and measuring a workpiece (see FIG. 1 and FIG. 2).

The base 200 includes a base portion 210, a base cover 220 spacing an accommodating space 250 with the base portion 210, and an end board 230 closing both ends of the base 200.

The base portion 210 is a longitudinally extended substantially rectangular parallelepiped with a flat upper surface on its top. The base portion 210, for instance, is made of a material with a low thermal expansion rate to avoid deformation to heat.

On the upper surface of the base portion 210, three mounts 211, 212, 213 each having a length along a longitudinal direction of the base portion 210 are arranged at a prespecified distance therebetween. The mount 211, the mount 212 and the mount 213 are arranged in order on one side edge.

The base cover 220 includes a top board 224 substantially the same shape as the upper surface of the base portion 210, a side board 225 formed by folding both side edges of the top board 224, and an accommodating space 250 provided on the upper surface side of the base portion 210 and providing a given space with the upper surface side of the base portion 210.

Three slits 221, 222, 22 having a length along a longitudinal direction are openly formed on the top board 224. Each position of the slits 221, 222, 223 are substantially corresponding to the position of the mounts 211, 212, 213.

The running section 800 includes a running head 300 running back and forth along a longitudinal direction of the base 200, a guide mechanism 400 for guiding in a running direction of the running head 300, a drive unit 500 for driving the running head 300, and a connecting unit 600 connecting the drive unit 500 with the running head 300.

The running head 300 is described below.

The running head 300 includes a running head body 330, a head cover 321 (Refer to FIG. 1), and an elevated base section 310.

The running head body 330 has a form like a depressed rectangular parallelepiped as a whole. The running head body 330 runs on the base cover 220, and the measuring section 700 is provided on an upper surface of the running head body 330.

Further, the running head body 330 includes a concave portion 320 having recesses towards the center from substantially center of one end face with given widths and being substantially rectangular at a plain view (Refer to FIG. 6), and the head cover 321 is provided so as to cover the concave portion 320.

The elevated base section 310 is provided on a bottom surface along both side edges of the running head body 330 in the upright state. An elevated base 311 is provided in the upright state on one side edge of the running head body 330 and an elevated base 312 is provided on the other side edge of the running head body 330 in the upright state.

When the running head body 330 runs on an upper surface of the base cover 220, the elevated base section 310 (the elevated bases 311, 312) is inserted into the slits 221, 223 and the bottom edge of the elevated base section 310 is positioned in the accommodating space 250 in the base 200.

The running head 300, for instance, is made of such as aluminum alloy for weight saving.

The guide mechanism 400 is described below.

The guide mechanism 400 is provided in the accommodating space 250 in the base 200.

The guide mechanism 400 includes a main guide mechanism 410 for guiding in a direction along a longitudinal direction of the base 200 (in a first direction along the running direction of the running head), and a sub-guide mechanism 450 for guiding in the orthogonal direction of a longitudinal direction of the base 200 (in a second direction which is orthogonal direction to the direction for guiding the main guide mechanism 410) (Refer to FIG. 2, FIG. 5 and FIG. 6).

Although the directions for guiding the main guide mechanism 410 and the sub-guide mechanism do not exactly intersect each other (they are exactly torsional to each), it unit the directions projecting each direction on a surface of the base portion 210 intersect each other. In this specification, therefore, the directions for guiding the main guide mechanism 410 and the sub-guide mechanism 450 are described as being orthogonal or intersect each other.

The main guide mechanism 410 includes a main rail 420 provided along a longitudinal direction on a surface of the base portion 210, and a main slider 430 sliding on the main rail 420.

The main rail 420 includes a first main rail 421 provided on one side edge of the base portion 210, and a second main rail 422 provided on an upper surface of the mount 213 on the other side edge of the base portion 210.

The main slider 430 is a cross sectional concaved member, and is provided across the main rail 420.

The main slider 430 is included of a first main slider 431 and a second main slider 432 sliding the first main rail 421, and a third main slider 433 and a fourth main slider 434 sliding the second main rail 422.

The first main slider 431 and the second main slider 432 are connected with a lower end of the elevated base section 310 via the sub-guide mechanism 450, and the first main slider 431 is provide on one end to side and the second main slider 432 is provided on the other end to side at lower surface sides of the running head 300.

The third main slider 433 is fixed on one end to side of the elevated base 312 and the fourth main slider 434 is fixed on the other end to side of the elevated base 312.

The sub-guide mechanism 450 includes a sub-rail 460 provided on each surface of the first main slider 431 and the second main slider 432 along a substantially orthogonal direction in a direction for guiding the main guide mechanism 410, and a sub-slider 470 sliding on the sub-rail 460.

The sub-rail 460 includes a first sub-rail 461 provide on a top surface of the first main slider 431, and a second sub-rail 462 provided on an upper surface of the second main slider 432.

The sub-slider 470 is a cross sectional concaved member and is provide across the sub-rail 460 (the first sub-rail 461 and the second sub-rail 462), and includes a first sub-slider 471 sliding on the fist sub-rail 461 and a second sub-slider 472 sliding on the second sub-rail 462.

The first sub-slider 471 is fixed on one end to side of the elevated base 311, and the second sub-slider 472 is fixed on the other end to side of the elevated base 311.

The drive unit 500 is described below.

The drive unit 500 includes a rack 510 provided along a longitudinal direction of the base portion 210, a pinion 520 engaging with the rack 510, a swing support unit 530 supporting swings of the pinion 520, a rotary driving unit 560 rotating the pinion 520, and a biasing mechanism 570 enforcing the pinion 520 towards the rack 510 (Refer to FIG. 2, FIG. 3 and FIG. 4).

The rack 510 is fixed on the mount 212 in parallel to the both rails 421, 422 between the first main rail 421 and the second main rail 422.

The rack 510 has rack teeth and a surface of the rack teeth is provided on one side surface of the rack 510 (a side surface facing to the first main rail). In other word, the direction of a normal line for the surface of the rack teeth is in parallel to the upper surface of the base portion 210 and in vertical to the direction for guiding the main guide mechanism 410.

The pinion 520 has pinion teeth engaging with the rack teeth of the rack 510 and a direction of rotation axis of the pinion 520 is perpendicular to the upper surface of the base portion 210. The pinion 520 moves back and forth along the longitudinal direction of the base 200 as rotating on the rack 510 with engagement.

One end of the swing support unit 530 is supported by a swing shaft 550 in parallel to a rotation axis of the pinion 520 and the other end thereof is capable of swinging to a direction closely by or isolating from the rack 510, and the swing support unit 530 includes a swing arm 540 supporting the pinion 520 rotatably.

The swing arm 540 includes an arm body section 541 provided on the concave portion 320 of the running head body 330, and a pinion accommodating section 542 provided in series at a lower end of arm body section 541 and accommodating the pinion 520 therein.

The arm body section 541 has the swing shaft 550 inserted into at one end and the other end thereof is capable of swinging by this swing shaft 550.

The pinion accommodating section 542 is formed as a frame having a through hole 542D vertical to the surface of the rack teeth at a lower end of the arm body section 541, and includes a one end side pillar 542A pending in series from one end to side of the arm body section 541, the other end side pillar 542B pending in series from the other end to side of the arm body section 541, and a lower frame 542C connecting to the lower edges of the one end side pillar 542A and the other end side pillar 542B. The pinion 520 is accommodated within the through hole 542D of the pinion accommodating section 542.

A line L (see FIG. 4) connecting the rotation axis of the pinion 520 to the swing shaft of the swing arm 540 is substantially in parallel to the rack 510.

A rotary driving unit 560 includes a motor (driving source) 564, a transfer mechanism 563 transferring rotary power of the motor 564, a drive gear 565 rotatingly driven by the motor 564 via the transfer mechanism 563, and a driving shaft 566 rotated by the drive gear 565.

A bracket 562 is provided in the protruding state in series on one side edge of the arm body section 541 (Refer to FIG. 3), and includes a housing 561. The motor 564 is provided in pending from the housing 561 and the transfer mechanism 563 having gear train and belt and pulley in the housing 561 is also provided in pending from the housing 561.

The drive gear 565 is rotatably provided on an upper surface of the arm body section 541, and a line of a rotation axis of the drive gear 565 and a line of a rotation axis of the pinion 520 are identical.

The driving shaft 566 is rotatably provided piercing into the arm body section 541 and the pinion accommodating section 542, and couples the axis of the drive gear 565 to the axis of the pinion 520. Then, rotation of the drive gear 565 is transferred to the pinion 520 by the driving shaft 566, and the pinion 520 starts rotating driven by the drive gear 565.

As the driving shaft 566 is inserted into the swing arm 540, the driving shaft 566 and the swing arm 540 are engaged with each other.

The biasing mechanism 570 includes a wall board 571 provided substantially in parallel to the rack 510 placing the pinion 520 in between, a tension roller 573 moving along the wall board 571 rotating on the wall board 571, a lever arm 572 provided substantially in parallel to the swing arm 540 and supporting the tension roller 573 rotatably with an axis substantially at the center of the lever arm 572, a spring 574 enforcing to move one end of the lever arm 572 away from the swing arm 540, and a connecting rod 576 provided prudently in series on the other end of the swing arm 540 and connected rotatably to the other end of the lever arm 572 (see FIG. 4 and FIG. 6).

The wall board 571 is provided via the mount 211 on the upper surface of the base portion 210, facing to the rack 510 away for a given distance placing the pinion 520 in between.

The tension roller 573 has a rotation axis substantially in vertical to the upper surface of the base portion 210. A connecting line connecting the rotation axis of the tension roller 573 to the rotation axis of the pinion 520 substantially crosses to the rack 510.

The lever arm 572 is provided between the wall board 571 and the pinion accommodating section 542, substantially in parallel to the wall board 571 and the pinion accommodating section 542 respectively, and is capable of swinging. Besides, the tension roller 573 is provided rotatably substantially at the center of the lever arm 572. Thereby, the lever arm 572 becomes "lever" having a rotation axis of the tension roller 573 as a supporting point.

Further, the spring 574 is provided between one end of the lever arm 572 and one end of the pinion accommodating section 542 (one end side pillar 542A), and enforces to move one end of the lever arm 572 away from one end of the pinion accommodating section 542 (enforces to approach one end of the lever arm 572 to one end of the wall board 571).

The connecting rod 576 is provided in the protruding state in series from the other end of the pinion accommodating section 542 (the other end side pillar 542B) to the other end of the wall board 571, and the other end of the lever arm 572 is rotatably pivoted on the connecting rod 576.

When one end of the lever arm 572 is biased to move away from the rack 510 by the spring 574, the other end of the lever arm 572 is enforced to move towards the rack 510. Thereby, the other end to side of the swing arm 540 is enforced to move towards the rack 510 via the connecting rod 576.

The connecting unit 600 is described below.

The connecting unit 600 includes a swing holder 610, and the connecting members 620, 620 (see FIG. 2 and FIG. 6).

The swing holder 610 is a frame-like component having a through hole in which the swing arm 540 is inserted by its one end so as to receive the swing arm 540 in the through hole. The swing shaft 550 is penetrated through the swing holder 610 and one end of the swing arm 540 so that the swing arm 540 is capable of swinging against the swing holder 610 around the swing shaft 550.

Connecting members 620, 620 having L-like cross section connect the swing holder 610 to the running head body 330.

In this invention, the slider device includes the base 200 and the running section 800.

The measuring section 700 includes a Z-column 710 provided on an upper surface of the running head 300, and a Y-spindle 720 placed on the Z-column 710 capable of moving up and down and having a length crossing to a longitudinal direction of the base 200. The Y-spindle 720 is extensible, and is provided with a probe 730 for detecting a surface of a workpiece as attaching to a workpiece (not shown in the Figs.) at one end of the Y-spindle 720.

It is desirable that a location detector unit 740 for detecting coordinates of the probe 730 is provided at a prespecified position. The location detector unit 740 may have the arrangement described below.

Unit of detecting a location of the running head 300 may be, for instance, the displacement detector 741 (refer to FIG. 5) which detects relative amounts of displacement between the second main rail 422 and the third main slider 433 (or forth main slider 434), or a rotary detector 742 (refer to FIG. 3) which detects a number of rotating of the motor 564, or a rotary detector 743 (refer to FIG. 6) which detects a number of rotating of the pinion 520.

Moreover, it is desirable that a displacement detector unit for detecting an amount of lifting of the Y-spindle 720 against Z-column 710 and an amount of extension of the Y-spindle 720 is provided.

An action of a coordinate measuring machine having the configuration as described above is described below.

At first, an action of the running head 300 running back and forth towards a longitudinal direction of the base 200 is described below.

When the motor 564 rotates, a driving force of the motor 564 is transferred to the drive gear 565 via the transfer mechanism 563, and the drive gear 565 is driven for rotating.

The driving shaft 566 rotates by rotating of the drive gear 565 and a rotating force of the drive gear 565 is transferred to the pinion 520, and the pinion 520 rotates following the rotation of the drive gear 565.

When the pinion 520 rotates in the state of engaging to the rack 510, the pinion 520 moves along the rack 510.

When the driving shaft 566 moves along the rack 510 together with the pinion 520, as the driving shaft 566 is engaged to the swing arm 540 (the driving shaft 566 is penetrated through the swing arm 540), the swing arm 540 moves along the rack 510 together with the driving shaft 566.

As the swing arm 540 is connected to the swing holder 610 via the swing shaft 550 (the swing shaft 550 is penetrated through the swing holder 610 and the swing arm 540), the swing holder 610 moves along the rack 510 together with the swing arm 540 (the drive unit 500).

As the swing holder 610 is fixed by the connecting members 620, 620 on the running head 300, the running head 300 runs along the rack 510 together with the swing holder 610.

In this step, as the third main slider 433 and the fourth main slider 434 are slidably engaged in the second main rail 422 of the main guide mechanism 410, the running head 300 runs in a direction for guiding the main guide mechanism 410.

An action of moving the running head 300, which is moved by the rotation of the pinion 520, is described below in a case where the rack 510 has teeth of different heights.

If the rack 510 has teeth with different heights, a force acting in the vertical direction (the orthogonal direction to a running direction) to the rack 510 effects on the pinion 520, then the pinion 520 vibrates on the orthogonal direction to a running direction.

When the pinion 520 vibrates in the orthogonal direction to a running direction, the driving shaft 566 vibrates together with the pinion 520.

As the swing arm 540 sets in the state of capable of swinging around one end of the swing shaft 550, the other end of the swing arm 540 vibrates together with the pinion 520 and the driving shaft 566.

Then, vibration of the pinion 520 in the orthogonal direction to the running direction is absorbed in swings of the swing arm 540 so that vibration of the pinion 520 is not transmitted to the swing holder 610 which is placed at the end of the swing arm 540, then the running head 300 runs in a direction for guiding by the main guide mechanism 410.

At this time, as the other end of the pinion accommodating section 542 is enforced towards the rack 510 by the biasing mechanism 570, the pinion 520 and the rack 510 were engaged at a constant engagement force.

Then, an action when an amount of thermal expansion is different between the running head 300 and the base portion 210 at temperature change is described below.

When the running head 300 is made of a light material such as aluminum alloy and the base portion 210 is made of a low thermal expansion material, an amount of thermal expansion (an amount of thermal deformation) of the running head 300 and the base portion 210 becomes different at temperature change.

Especially, when an amount of deformation becomes different in a lateral direction (the direction orthogonal to a running direction) of them, a width of the running head 300 becomes different against a distance between the first main rail 421 and the second main rail 422.

In this case, as the sub-rail 460 (the first sub-rail 461 and the second sub-rail 462) is provided on a surface of the first main slider 431 and the second main slider 432, and the sub-slider 470 (a first sub-slider 471 and a second sub-slider 472) is inserted into the sub-rail 460, the sub-slider 470 slides in the orthogonal direction to a running direction corresponding to the deformation of the running head 300.

Then, the difference in the amount of deformation between the running head 300 and the base portion 210 is absorbed.

Next, measurement of a workpiece is described below.

When measuring a workpiece, the workpiece is scanned by the probe 730 attaching to the object. In other word, the actions such as a running action of the running head 300, a lifting action of the Y-spindle 720 and an expanding action of the Y-spindle 720 are controlled by a designated control unit so that the probe 730 keeps attaching to the object.

With the embodiment having the configuration as described above, the following effects can be achieved.

(1) Even when there is a difference in heights of rack teeth of the rack 510, as the pinion 520 is supported in the swingable manner by the swing arm 540, the pinion 520 swings and escapes in the direction substantially orthogonal to the rack 510. Therefore, an excessive engagement pressure is never generated between the pinion 520 and the rack 510, so that physical damages to the pinion 520 and rack 10 are prevented with the geometrical accuracy maintained.

(2) Even when there is a difference in heights of rack teeth of the rack 510, stress acting in the direction orthogonal to the rack 510 can be absorbed by oscillation of the swing arm 540. Therefore, stress acting in a direction different from the guide direction is not loaded to the main guide mechanism 410 (especially, the second main rail 422, third main slider 433, fourth main slider 434), so that damages of the main guide mechanism 410 is prevented with the geometrical accuracy maintained. As a result, accuracy in sliding movement of the running head 300 becomes higher.

(3) As the pinion 520 is biased toward the rack 510 by the biasing mechanism 570 via the swing arm, so that an engagement pressure between the rack 510 and pinion 520 is maintained at a constant level. Because of this feature, such troubles as disengagement can be prevented, and also large backlash can be prevented.

(4) The swing arm 540 is supported in the swingable manner in the posture substantially parallel to the rack 510, and therefore when the other edge of the awing arm 540 is biased toward the rack 510, the pinion 520 can be biased in the direction substantially orthogonal to the tooth surface of the rack 510. As the pinion 520 is biased in the direction substantially vertical to the rack 510, regardless of the direction of relative movement between the rack 510 and pinion 520 (running direction of the running head), an appropriate engagement pressure can be provided.

(5) The other edge of the swing arm 540 can be biased toward the rack 510 based on the principle of leverage by swinging the lever arm 572 at the rotation shaft of the tension roller as a supporting point.

(6) As there is provided the sub-guide mechanism 450, even when a different in an amount of thermal expansion is generated due to a temperature change between the running head 300 and the base portion 210, the sub-slider 470 slides the sub rail 460 in the direction orthogonal to the guide direction by the main guide mechanism 410, so that a difference in an amount of thermal deformation can be absorbed. As a result, stress acting in the direction other than the guide direction by the main guide mechanism 41 is never generated, so that the geometrical accuracy of the main guide mechanism 410 can be preserved.

(7) As a difference in an amount of thermal deformation between the running head 300 and the base portion 210 is allowable, the running head 300 may be formed with a light material (such as, for instance, aluminum alloy). As a result, the running head can be run at a higher speed.

(8) Even when the parallelism between the first main rail 421 and second main rail 422 is not accurate, the fluctuation in a space between the main rails is absorbed by the sub-guide mechanism 450 (sub-rail 460, sub-slider 470). Therefore, even if the parallelism between the first main rail 421 and the second main rail 422 is not accurate, accuracy in movement of the running head 300 can be maintained. As a result, accuracy of dimensions of parts or in mounting may be lower, the parts cost or assembly cost can be reduced.

The present invention is not limited to the embodiment described above, and deformations and improvements within a range in which the objects of the present invention can be attained are included in a scope of the present invention.

For instance, in the embodiment described above, the rack is provided in the base portion, and the pinion is provided on the running head, but on the contrary the rack may be provided on the running head and the pinion in the base portion.

Configuration of the biasing mechanism is not limited to the embodiment above, and any configuration may be employed on the condition that a swing edge of the swing arm is biased toward the rack.

In the embodiment described above, two main rails are provided, but also the configuration is allowable in which, for instance, three or four rails are provided. In this case, a slider sliding on the utmost outer one of the main rails is attached and fixed to the running head, and a sub-guide mechanism is provided on a top surface of each of the main sliders sliding on other main rails.

The priority application Number JP2004-115969 upon which this patent application is based is hereby incorporated by reference.

What is claimed is:

1. A slider device comprising:
    a base;
    a running head slidably provided on said base along a direction guided by a prespecified guide mechanism;
    a rack provided in a fixed state on either said base or said running head along the guide direction by said guide mechanism;
    a pinion engaging with rack teeth of said rack and rotatingly driven by a prespecified power source;
    a swing arm rotatably supporting said pinion, having a swing shaft parallel to a rotary shaft of said pinion, and coupled to either one of said base and said running head via said swing shaft in a swingable manner with a state in which the line extending between said swing shaft and the rotary shaft of said pinion is substantially parallel to said rack as a reference state; and
    a biasing mechanism for biasing said pinion toward said rack via said swing arm.

2. The slider device according to claim 1, wherein said biasing mechanism comprises a wall plate provided at a position opposite to the toothed surface of said rack with said pinion in between, a tension roller contacting and rolling along said wall plate, and a lever arm provided in a swingable manner with a posture substantially parallel to said swing arm as the reference state and rotatably supporting the tension roller at substantially central position, a biasing unit for biasing an edge of said lever arm away from said swing arm, and a coupling arm continuously protruding from the swing edge side of said swing arm and rotatably coupled to the other edge of said lever arm.

3. A measuring instrument comprising:
    a slider device having a base and a running head slidably provided on said base along a direction guided by a prespecified guide mechanism;
    a measuring section having a detecting section moved by said running head and detecting a workpiece by scanning a surface of the workpiece; and
    a position detecting unit for detecting a coordinate position of said detecting section;
    wherein the slider device further comprises:
    a rack provided in a fixed state on either said base or said running head along the guide direction by said guide mechanism;
    a pinion engaging with rack teeth of said rack and rotatingly driven by a prespecified power source;
    a swing arm rotatably supporting said pinion, having a swing shaft parallel to a rotary shaft of said pinion, and coupled to either one of said base and said running head via said swing shaft in a swingable manner with a state in which the line extending between said swing shaft and the rotary shaft of said pinion is substantially parallel to said rack as a reference state; and
    a biasing mechanism for biasing said pinion toward said rack via said swing arm.

4. The measuring instrument according to claim 3, wherein said biasing mechanism comprises a wall plate provided at a position opposite to the toothed surface of said rack with said pinion in between, a tension roller contacting and rolling along said wall plate, and a lever arm provided in a swingable manner with a posture substantially parallel to said swing arm as the reference state and rotatably supporting the tension roller at substantially central position, a biasing unit for biasing an edge of said lever arm away from said swing arm, and a coupling arm continuously protruding from the swing edge side of said swing arm and rotatably coupled to the other edge of said lever arm.

* * * * *